United States Patent
Yang (10) Patent No.: US 8,631,310 B2
(45) Date of Patent: Jan. 14, 2014

(54) METHOD FOR REDUCING UNCORRECTABLE ERRORS OF A MEMORY DEVICE REGARDING ERROR CORRECTION CODE, AND ASSOCIATED MEMORY DEVICE AND CONTROLLER THEREOF

(71) Applicant: Silicon Motion Inc., Hsinchu County (TW)

(72) Inventor: Tsung-Chieh Yang, Hsinchu (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 0 days.

(21) Appl. No.: 13/942,724

(22) Filed: Jul. 16, 2013

(65) Prior Publication Data

US 2013/0305121 A1 Nov. 14, 2013

Related U.S. Application Data

(63) Continuation of application No. 12/774,736, filed on May 6, 2010, now Pat. No. 8,516,354.

(30) Foreign Application Priority Data

Dec. 8, 2009 (TW) ................................ 98141899 A (51) Int. Cl.
*G06F 11/08* (2006.01)

(52) U.S. Cl.
USPC ........... 714/797; 714/773; 714/746; 714/763; 714/764; 714/799

(58) Field of Classification Search
None
See application file for complete search history.

(56) References Cited

U.S. PATENT DOCUMENTS

| 7,177,195 | B2 * | 2/2007 | Gonzalez et al. | 365/185.21 |
| 7,975,192 | B2 * | 7/2011 | Sommer et al. | 714/719 |
| 8,230,300 | B2 * | 7/2012 | Perlmutter et al. | 714/763 |
| 2005/0172068 | A1 * | 8/2005 | Sukegawa | 711/103 |
| 2009/0024905 | A1 * | 1/2009 | Shalvi et al. | 714/773 |
| 2009/0282316 | A1 * | 11/2009 | Lingam et al. | 714/763 |
| 2009/0292971 | A1 * | 11/2009 | Man et al. | 714/763 |
| 2010/0131827 | A1 * | 5/2010 | Sokolov et al. | 714/763 |
| 2010/0165730 | A1 | 7/2010 | Sommer | |

FOREIGN PATENT DOCUMENTS

| CN | 1230824 A | 10/1999 |
| CN | 101601094 A | 12/2009 |

* cited by examiner

*Primary Examiner* — John Trimmings (74) *Attorney, Agent, or Firm* — Winston Hsu; Scott Margo (57) ABSTRACT

A method for reducing uncorrectable errors of a memory device regarding Error Correction Code (ECC) includes: performing majority vote according to data read at different times at a same address in order to generate majority vote data corresponding to the address; and checking whether the majority vote data has any uncorrectable error in order to determine whether to output the majority vote data as data of the address. For example, the method further includes: within the data read at different times at the same address, temporarily storing all of the data except for data of a last time into buffering regions/buffers, respectively, with the majority vote data being temporarily stored into a second buffering region/buffer to utilize a latest generated portion within the majority vote data to replace a latest retrieved portion within data in the second buffering region/buffer. An associated memory device and the controller thereof are further provided.

5 Claims, 4 Drawing Sheets

FIG. 4
METHOD FOR REDUCING UNCORRECTABLE ERRORS OF A MEMORY DEVICE REGARDING ERROR CORRECTION CODE, AND ASSOCIATED MEMORY DEVICE AND CONTROLLER THEREOF

CROSS REFERENCE TO RELATED APPLICATIONS

This application is a continuation application of U.S. patent application Ser. No. 12/774,736, which was filed on May 6, 2010, and is entitled "METHOD FOR REDUCING UNCORRECTABLE ERRORS OF A MEMORY DEVICE REGARDING ERROR CORRECTION CODE, AND ASSOCIATED MEMORY DEVICE AND CONTROLLER THEREOF".

BACKGROUND OF THE INVENTION

1. Field of the Invention

The present invention relates to error correction of a Flash memory control chip, and more particularly, to a method for reducing uncorrectable errors of a memory device regarding error correction code (ECC), and to an associated memory device and a controller thereof.

2. Description of the Prior Art

As technologies of Flash memories progress in recent years, many kinds of portable memory devices (e.g. memory cards respectively complying with SD/MMC, CF, MS, and XD standards) or solid state drives (SSDs) equipped with Flash memories are widely implemented in various applications. Therefore, the control of access to Flash memories in these memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. However, various problems of the MLC Flash memories have arisen due to their unstable characteristics. Although there are some solutions proposed by the related art in response to these problems, it seems unlikely that the related art gives consideration to both operation performance and system resource management. As a result, no matter which solution is chosen, a corresponding side effect typically exists. Thus, a novel method is required for enhancing the control of data access of a Flash memory in a memory device, in order to give consideration to both operation performance and system resource management.

SUMMARY OF THE INVENTION

It is therefore an objective of the claimed invention to provide a method for reducing uncorrectable errors of a memory device regarding error correction code (ECC), and to provide an associated memory device and a controller thereof, in order to solve the above-mentioned problems.

It is another objective of the claimed invention to provide a method for reducing uncorrectable errors of a memory device regarding ECC, and to provide an associated memory device and a controller thereof, in order to give consideration to both operation performance and system resource management.

According to at least one preferred embodiment of the claimed invention, a method for reducing uncorrectable errors of a memory device regarding ECC comprises: performing majority vote according to data read at different times at a same address in order to generate majority vote data corresponding to the address; and checking whether the majority vote data has any uncorrectable error in order to determine whether to output the majority vote data as data of the address. For example, the method may further comprises within the data read at different times at the same address, temporarily storing all of the data except for data of a last time into a plurality of buffering regions/buffers, respectively, and the step of performing the majority vote according to the data read at different times at the same address in order to generate the majority vote data corresponding to the address may further comprise: during performing the majority vote, temporarily storing the majority vote data into a second buffering region/buffer of the buffering regions/buffers, in order to utilize a latest generated portion within the majority vote data to replace a latest retrieved portion within data in the second buffering region/buffer, wherein the latest retrieved portion in the second buffering region/buffer is a portion that is latest retrieved for performing the majority vote.

While the method mentioned above is disclosed, an associated memory device is further provided. The memory device comprises: a Flash memory comprising a plurality of blocks; and a controller arranged to access the Flash memory and manage the plurality of blocks, and to reduce uncorrectable errors of the memory device regarding ECC. In addition, the controller performs majority vote according to data read at different times at a same address in order to generate majority vote data corresponding to the address. Additionally, the controller checks whether the majority vote data has any uncorrectable error in order to determine whether to output the majority vote data as data of the address. For example, the controller may further, within the data read at different times at the same address, temporarily store all of the data except for data of a last time into a plurality of buffering regions/buffers, respectively, and temporarily store, corresponding to performing the majority vote, the majority vote data into a second buffering region/buffer of the buffering regions/buffers, in order to utilize a latest generated portion within the majority vote data to replace a latest retrieved portion within data in the second buffering region/buffer, wherein the latest retrieved portion in the second buffering region/buffer is a portion that is latest retrieved for performing the majority vote. In another example, the controller may further comprise a majority vote module arranged to perform the majority vote according to the data read at different times at the same address in order to generate the majority vote data corresponding to the address, an ECC decoder arranged to perform ECC decoding, and a plurality of multiplexers arranged to perform multiplexing operations to control data flows within the controller, wherein a program code executed by a microprocessor within the controller comprises a plurality of program modules/units, and at least a portion of the majority vote module, the ECC decoder, and the multiplexers is implemented by utilizing the microprocessor executing the program modules/units.

While the method mentioned above is disclosed, a controller of a memory device is further provided, wherein the controller is utilized for accessing a Flash memory of the memory device, and the Flash memory comprises a plurality of blocks. The controller comprises: a read only memory (ROM) arranged to store a program code; and a microprocessor arranged to execute the program code to control the access to the Flash memory and manage the plurality of blocks, wherein the controller that executes the program code by utilizing the microprocessor is further arranged to reduce uncorrectable errors of the memory device regarding ECC. In addition, the controller performs majority vote according to data read at different times at a same address in order to generate majority vote data corresponding to the address. Additionally, the controller checks whether the majority vote data has any uncorrectable error in order to determine whether to output the majority vote data as data of the address. For example, the controller may further, within the data read at different times at the same address, temporarily store all of the data except for data of a last time into a plurality of buffering regions/buffers, respectively, and temporarily store, corresponding to performing the majority vote, the majority vote data into a second buffering region/buffer of the buffering regions/buffers, in order to utilize a latest generated portion within the majority vote data to replace a latest retrieved portion within data in the second buffering region/buffer, wherein the latest retrieved portion in the second buffering region/buffer is a portion that is latest retrieved for performing the majority vote. In another example, the controller may further comprise a majority vote module arranged to perform the majority vote according to the data read at different times at the same address in order to generate the majority vote data corresponding to the address, an ECC decoder arranged to perform ECC decoding, and a plurality of multiplexers arranged to perform multiplexing operations to control data flows within the controller, wherein a program code executed by a microprocessor within the controller comprises a plurality of program modules/units, and at least a portion of the majority vote module, the ECC decoder, and the multiplexers is implemented by utilizing the microprocessor executing the program modules/units.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
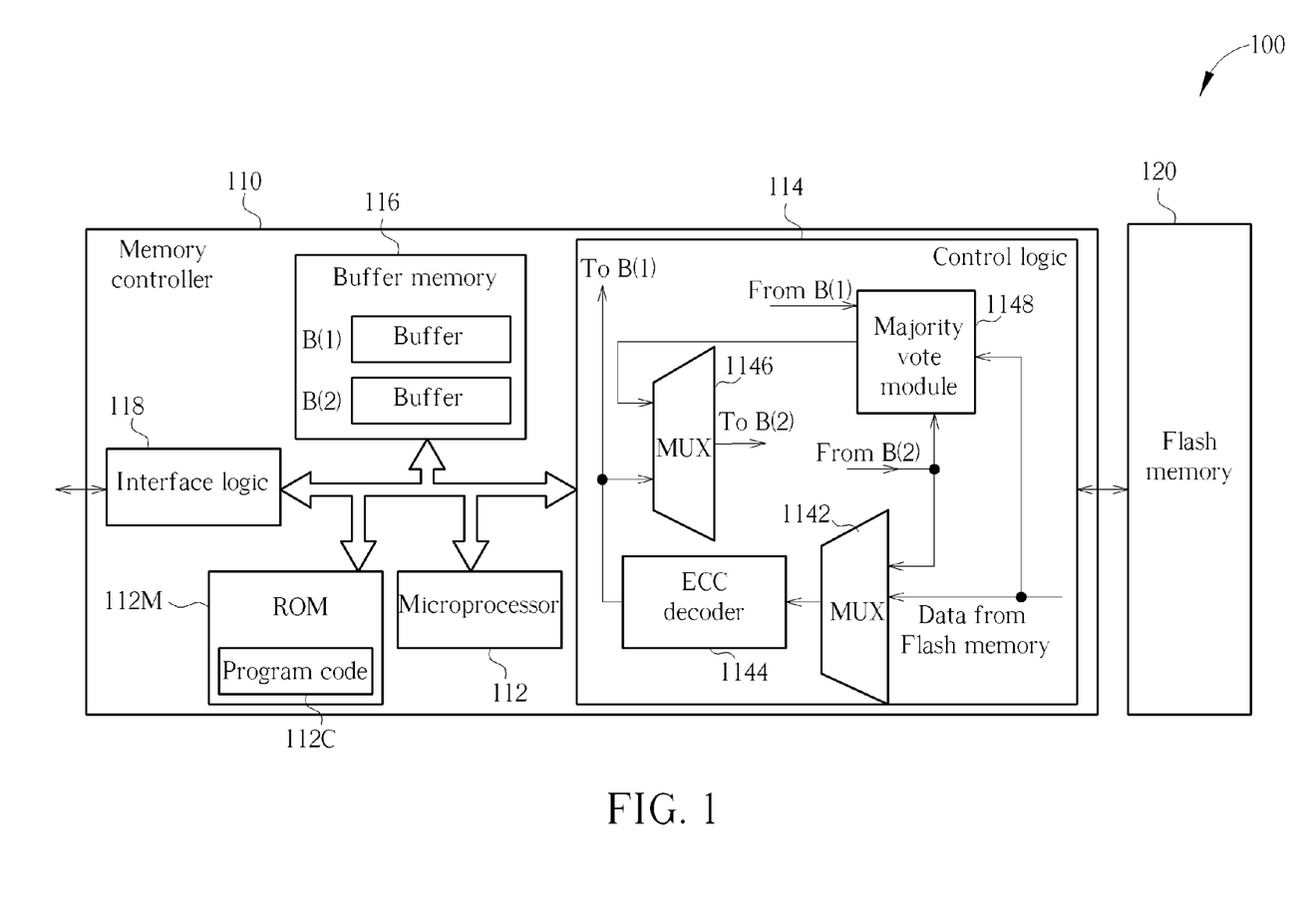
FIG. 1 is a diagram of a memory device according to a first embodiment of the present invention.

Please refer to FIG. 1, which illustrates a diagram of a memory device 100 according to a first embodiment of the present invention. In particular, the memory device 100 of this embodiment can be a portable memory device (e.g. a memory card complying with SD/MMC, CF, MS, or XD standards) or a solid state drive (SSD). The memory device 100 comprises a Flash memory 120, and further comprises a controller arranged to access the Flash memory 120, where the aforementioned controller of this embodiment is a memory controller 110. According to this embodiment, the memory controller 110 comprises a microprocessor 112, a read only memory (ROM) 112M, a control logic 114, a buffer memory 116, and an interface logic 118, where the control logic 114 comprises multiplexers 1142 and 1146 (labeled "MUX" in FIG. 1), an error correction code (ECC) decoder 1144 (labeled "ECC decoder" in FIG. 1), and a majority vote module 1148. Here, the buffers B(1) and B(2) may represent different buffering regions within the buffer memory 116, or represent buffers having respective physical architecture within the buffer memory 116. In addition, the ROM 112M is arranged to store a program code 112C, and the microprocessor 112 is arranged to execute the program code 112C to control the access to the Flash memory 120. Please note that, according to different variations of this embodiment, the program code 112C can be stored in the buffer memory 116 or any other memory.

Typically, the Flash memory 120 comprises a plurality of blocks, and the controller (e.g. the memory controller 110 that executes the program code 112C by utilizing the microprocessor 112) performs data erasure operations on the Flash memory 120 by erasing in units of blocks. In addition, a block can be utilized for recording a specific amount of pages, where the controller mentioned above performs data writing operations on the Flash memory 120 by writing/programming in units of pages.

In practice, the memory controller 110 that executes the program code 112C by utilizing the microprocessor 112 is capable of performing various control operations by utilizing the internal components within the memory controller 110. For example, the memory controller 110 utilizes the control logic 114 to control access to the Flash memory 120 (e.g. operations of accessing at least one block or at least one page), utilizes the buffer memory 116 to perform buffering operations for the memory controller 110, and utilizes the interface logic 118 to communicate with a host device.

According to this embodiment, the multiplexers 1142 and 1146 can perform multiplexing operations to control data flows within the controller. For example, the multiplexers 1142 and 1146 can perform multiplexing operations according to the control of the microprocessor 112 executing the program code 112C. In another example, the multiplexers 1142 and 1146 can perform multiplexing operations according to the control of the logic circuits within the control logic 114. In addition, the ECC decoder 1144 is arranged to perform ECC decoding, and the majority vote module 1148 is arranged to perform the majority vote. In practice, all of the ECC decoder 1144, the majority vote module 1148, and the multiplexers 1142 and 1146 are a portion of the control logic 114, and are formed with the logic circuits within the control logic 114. This is for illustrative purposes only, and is not meant to be a limitation of the present invention. According to some variations of this embodiment, the program code 112C comprises some program modules/units, and at least a portion of the ECC decoder 1144, the majority vote module 1148, and the multiplexers 1142 and 1146 is implemented by utilizing the microprocessor 112 executing the program modules/units. For example, a portion of the ECC decoder 1144, the majority vote module 1148, and the multiplexers 1142 and 1146 is implemented by utilizing the microprocessor 112 executing the program modules/units, and the other portion of the ECC decoder 1144, the majority vote module 1148, and the multiplexers 1142 and 1146 is formed with the logic circuits within the control logic 114. In another example, all of the ECC decoder 1144, the majority vote module 1148, and the multiplexers 1142 and 1146 are implemented by utilizing the microprocessor 112 executing the program modules/units.

No matter whether the controller mentioned above is designed to be the architecture shown in FIG. 1 (e.g. all of the ECC decoder 1144, the majority vote module 1148, and the multiplexers 1142 and 1146 are a portion of the control logic 114) or a certain kind of architecture in the variations (e.g. at least a portion of the ECC decoder 1144, the majority vote module 1148, and the multiplexers 1142 and 1146 is implemented by utilizing the microprocessor 112 executing the program modules/units), the memory controller 110 that executes the program code 112C by utilizing the microprocessor 112 is further arranged to reduce uncorrectable errors of the memory device 100 regarding ECC. Related details are described by referring to FIG. 2.

Figure 2:
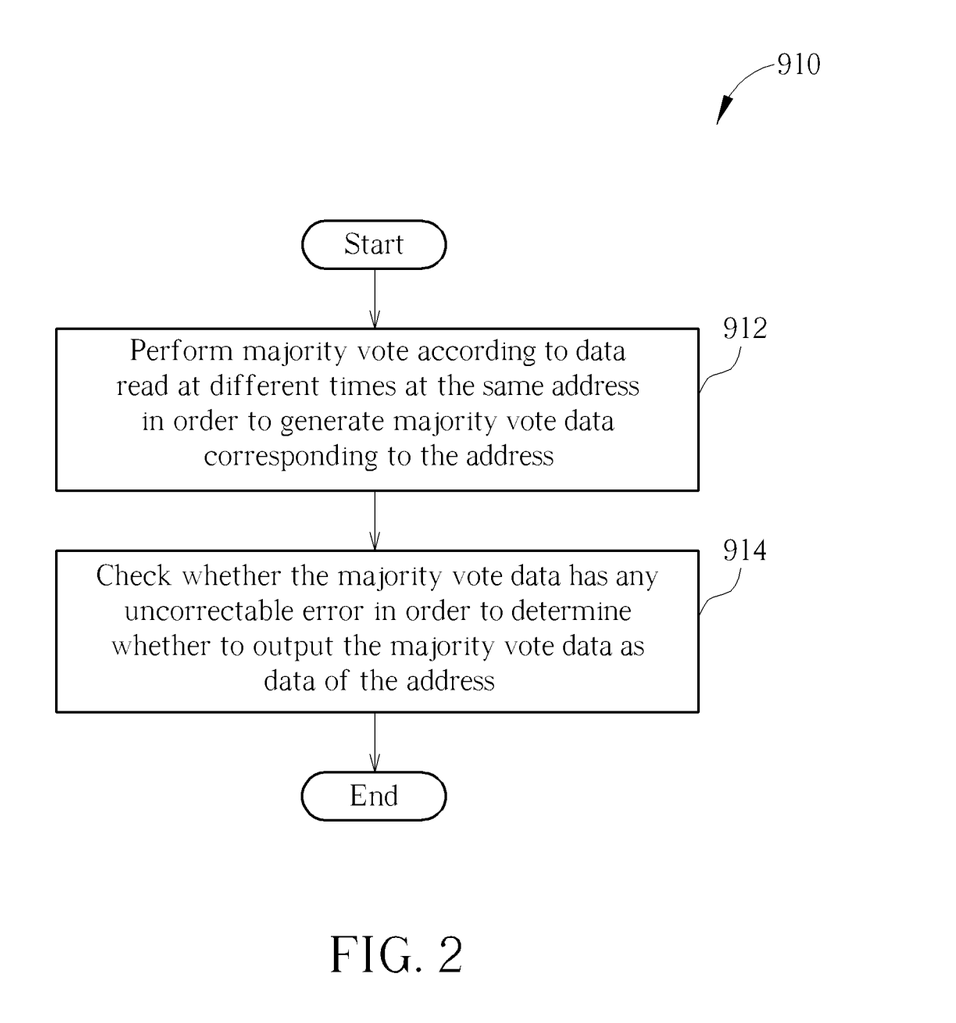
FIG. 2 is a flowchart of a method for reducing uncorrectable errors of a memory device regarding error correction code (ECC) according to an embodiment of the present invention.

FIG. 2 is a flowchart of a method 910 for reducing uncorrectable errors of a memory device regarding ECC according to an embodiment of the present invention. The method can be applied to the memory device 100 shown in FIG. 1, and more particularly, to the controller mentioned above (e.g. the memory controller 110 that executes the program code 112C by utilizing the microprocessor 112). In addition, the method can be implemented by utilizing the memory device 100 shown in FIG. 1, and more particularly, by utilizing the controller mentioned above. The method 910 is described as follows.

In Step 912, the aforementioned controller (and more particularly, the majority vote module 1148) performs majority vote according to data read at different times at the same address in order to generate majority vote data corresponding to the address. For example, when the controller reads the data at a first time at the address, one or more decoding errors (i.e. errors that cannot be corrected by utilizing ECC correction) occur. As a result, the controller sends a command to the Flash memory 120 to change the read threshold-voltage utilized for reading the data at the address. After changing the read threshold-voltage, the controller reads the data at a second time at the address. However, when the controller reads the data at the second time at the address, one or more decoding errors still occur. As a result, the controller sends a command to the Flash memory 120 to change the read threshold-voltage again. After changing the read threshold-voltage again, the controller reads the data at a third time at the address. However, when the controller reads the data at the third time at the address, one or more decoding errors still occur. This is for illustrative purposes only, and is not meant to be a limitation of the present invention. Please note that the number of times of reading the data at the same address may vary in different embodiments.

According to this embodiment, the read threshold-voltages that the controller utilizes for reading the data at different times at the same address are not all the same. In a situation where the read threshold-voltages that are utilized at different times are not all the same, the data read at different times at the same address may vary (i.e. a slight difference between the data read at the first time and the data read at the second time at the same address, such as the difference of one or more bits, may exist), and the majority vote module 1148 can perform the majority vote in order to generate the majority vote data corresponding to the address, and utilize the majority vote data to replace the data read at different times at the same address, whereby uncorrectable errors of the memory device 100 regarding ECC are reduced.

In Step 914, the controller checks whether the majority vote data has any uncorrectable error in order to determine whether to output the majority vote data as data of the address. For example, in a situation where there is no uncorrectable error in the majority vote data, the ECC decoder 1144 notifies the controller of the situation. As a result, the controller can output the majority vote data as the data of the address. In another example, in a situation where one or more uncorrectable errors exist in the majority vote data, the ECC decoder 1144 notifies the controller of the decoding errors. As a result, the controller can perform other operations accordingly, such as error marking operations regarding the storage space at the address.

According to a special case of this embodiment, the controller can temporarily store at least one portion of the data read at different times at the same address into a plurality of buffering regions/buffers such as the buffers B(1) and B(2) shown in FIG. 1, respectively. For example, within the data read at different times at the same address, the controller can first temporarily store all of the data except for data of the last time into the buffering regions/buffers, respectively, where the data of the last time can be read from the Flash memory 120 when the controller is performing the majority vote. More specifically, during performing the majority vote, within the data read at different times at the same address, the controller temporarily stores the data of the last time into a first buffering region/buffer of the buffering regions/buffers, such as the buffer B(1), in order to utilize the latest read portion within the data of the last time (e.g. at least one bit or byte) to replace the latest retrieved portion within the data in the first buffering region/buffer (e.g. at least one bit or byte), where the latest retrieved portion in the first buffering region/buffer is a portion that is latest retrieved for performing the majority vote. In addition, during performing the majority vote, the controller temporarily stores the majority vote data into a second buffering region/buffer of the buffering regions/buffers, such as the buffer B(2), in order to utilize the latest generated portion within the majority vote data (e.g. at least one bit or byte) to replace the latest retrieved portion within the data in the second buffering region/buffer (e.g. at least one bit or byte), where the latest retrieved portion in the second buffering region/buffer is a portion that is latest retrieved for performing the majority vote.

For example, a memory page in the Flash memory 120 is read at a first time (e.g. the first time mentioned above) and the read data of the first time is decoded to generate a page of decoded data, and the memory page is then read at a second time (e.g. the second time mentioned above) and the read data of the second time is decoded to generate a page of decoded data, where the page of decoded data corresponding to the read data of the first time is stored into the buffer B(1), and the page of decoded data corresponding to the read data of the second time is stored into the buffer B(2). Afterward, when reading the memory page at a third time (e.g. the third time mentioned above), the controller also sequentially reads the corresponding byte (or bit) in the buffers B(1) and B(2), respectively. Taking the first byte as an example, the controller reads the first byte in the buffer B(1) and the first byte in the buffer B(2). In the meantime, the majority vote module 1148 performs the majority vote on the first byte read from the buffer B(1), the first byte read from the buffer B(2), and the first byte obtained from reading the memory page at the third time, and stores the majority vote data obtained from performing the majority vote into the buffer B(2). Additionally, the controller stores the data (and more particularly, the first byte) obtained from reading the memory page at the third time into the buffer B(1). Please note that, after both the data (and more particularly, the first byte) that is originally obtained from reading and decoding the memory page at the first time and is currently in the buffer B(1) and the data (and more particularly, the first byte) that is originally obtained from reading and decoding the memory page at the second time and is currently in the buffer B(2) are retrieved (or read), the buffering space thereof (i.e. the buffering space originally occupied by the latest retrieved data) can be released for use of other purposes. As a result, the controller can store the data (and more particularly, the first byte) obtained from reading and decoding the memory page at the third time into the corresponding buffering space of the buffer B(1), and store the majority vote data (and more particularly, the first byte) obtained from performing the majority vote into the corresponding buffering space of the buffer B(2).

By utilizing the operations disclosed above, the present invention can save the total buffering space of the buffering regions/buffers, and during reading the data of the last time, both the data of the last time and the majority vote data are properly prepared for further use. More particularly, when the operation of reading the data of the last time is completed, the majority vote module 1148 almost completes the operation of the majority vote at the same time, and the ECC decoder 1144 almost completes the operation of the ECC decoding regarding the data of the last time at the same time. As a result, in a situation where there is no uncorrectable error in the data of the last time, the ECC decoder 1144 notifies the controller of the situation, and the controller can immediately read the data of the last time from the first buffering region/buffer such as the buffer B(1) and output it accordingly without wasting time. In addition, in a situation where one or more uncorrectable errors exist in the data of the last time, the ECC decoder 1144 can immediately perform error checking or ECC decoding on the majority vote data in the second buffering region/buffer such as the buffer B(2). As long as there is no uncorrectable error in the majority vote data, in Step 914, the controller can immediately read the majority vote data from the second buffering region/buffer such as the buffer B(2) and output it accordingly without wasting time. Therefore, the present invention method and the associated memory device and the controller thereof can provide extremely high performance.

Please note that, by utilizing the operations disclosed above, the present invention can save the total buffering space of the buffering regions/buffers. This is for illustrative purposes only, and is not meant to be a limitation of the present invention. According to some variations of this embodiment, in a situation where the number of buffering regions/buffers and the corresponding cost thereof do not have any strict upper bond in a design phase of the controller such as the memory controller 110, the controller can temporarily store the data read at each time at the same address into the buffering regions/buffers, where replacing any portion of data in the buffering regions/buffers is not required. That is, when keeping the cost down is not chosen as the first priority, extravagantly utilizing the buffer memory 116 is not excluded by the present invention.

Figure 3:
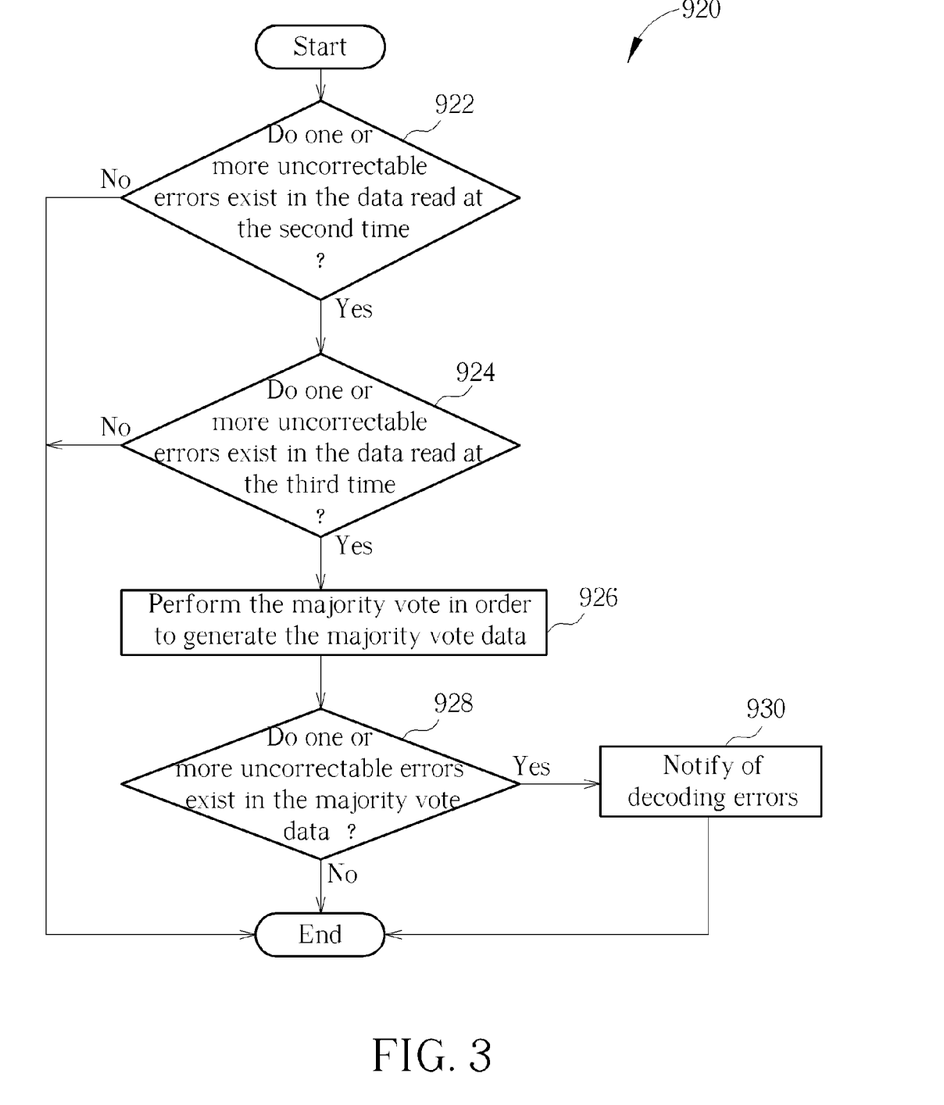
FIG. 3 illustrates some implementation details of the method shown in FIG. 2 according to an embodiment of the present invention.

FIG. 3 illustrates some implementation details of the method 910 shown in FIG. 2 according to an embodiment of the present invention, where the data read at different times at the same address as mentioned in Step 912 comprises the data D(1) read at the first time, the data D(2) read at the second time, ..., and the data D(N) read at the $N^{th}$ time, and the latter is the aforementioned data of the last time. For better comprehension, this embodiment can be described by referring to the architecture shown in FIG. 1, where the data paths between the respective components of the control logic 114 shown in FIG. 1 and the buffer memory 116 in this embodiment are not limited to be merely connected to the buffers B(1) and B(2).

According to this embodiment, the notation N is utilized for representing the number of times that the controller reads the data at the same address, where the number N is an odd number. For example, FIG. 3 illustrates a situation where N=3. Here, the data D(1) read at the first time is first temporarily stored in the buffer B(1) shown in FIG. 1, and the ECC decoder 1144 can perform error checking or ECC decoding on the data D(1) in the buffer B(1). In a situation where one or more uncorrectable errors exist in the data D(1) read at the first time, the controller executes the working flow 920 shown in FIG. 3.

In Step 922, the controller checks whether one or more uncorrectable errors exist in the data D(2) read at the second time. In particular, the data D(2) read at the second time is temporarily stored in the buffer B(2) shown in FIG. 1, and the ECC decoder 1144 can perform error checking or ECC decoding on the data D(2) in the buffer B(2). When it is detected that one or more uncorrectable errors exist in the data D(2) read at the second time, Step 924 is entered; otherwise, the working flow 920 is ended, which means the controller can output the data D(2) read at the second time as the data of the address.

In Step 924, the controller checks whether one or more uncorrectable errors exist in the data D(3) read at the third time. In particular, the data D(3) read at the third time is temporarily stored in another buffering region/buffer within the buffer memory 116, such as a buffer B(3) (not shown in FIG. 1), and the ECC decoder 1144 can perform error checking or ECC decoding on the data D(3) in the buffer B(3). When it is detected that one or more uncorrectable errors exist in the data D(3) read at the third time, Step 926 is entered; otherwise, the working flow 920 is ended, which means the controller can output the data D(3) read at the third time as the data of the address.

In Step 926, the controller (and more particularly, the majority vote module 1148) performs the majority vote in order to generate the aforementioned majority vote data such as majority vote data V(D(1), D(2), ..., D(N)). For example, in a situation where N=3, the majority vote data V(D(1), D(2), ..., D(N)) can be simply written as the majority vote data V(D(1), D(2), D(3)).

In Step 928, the controller checks whether one or more uncorrectable errors exist in the majority vote data. In particular, the majority vote data is temporarily stored in another buffering region/buffer within the buffer memory 116, such as a buffer B(0) (not shown in FIG. 1), and the ECC decoder 1144 can perform error checking or ECC decoding on the majority vote data in the buffer B(0). When it is detected that one or more uncorrectable errors exist in the majority vote data, Step 930 is entered; otherwise, the working flow 920 is ended, which means the controller can output the majority vote data as the data of the address.

In Step 930, the ECC decoder 1144 notifies the controller of the decoding errors.

Please note that FIG. 3 illustrates the respective operations of Step 924 and Step 926. This is for illustrative purposes only, and is not meant to be a limitation of the present invention. According to some variations of this embodiment, such as the special case mentioned above, Step 926 has no need to be illustrated in FIG. 3. In other words, Step 926 can be merged into Step 924. More particularly, during performing the majority vote, the controller temporarily stores the data D(3) read at the third time into the buffer B(1) within the buffer memory 116, in order to utilize the latest read portion within the data D(3) (e.g. at least one bit or byte) to replace the portion that is latest retrieved for performing the majority vote (e.g. at least one bit or byte) within the data D(1), which is originally temporarily stored in the buffer B(1). As a result, in Step 924, the ECC decoder 1144 can perform error checking or ECC decoding on the data D(3) in the buffer B(1). When it is detected that one or more uncorrectable errors exist in the data D(3) read at the third time, Step 928 is entered; otherwise, the working flow 920 is ended, which means the controller can output the data D(3) read at the third time as the data of the address. In addition, during performing the majority vote, the controller temporarily stores the majority vote data into the buffer B(2), in order to utilize the latest generated portion within the majority vote data (e.g. at least one bit or byte) to replace the portion that is latest retrieved for performing the majority vote (e.g. at least one bit or byte) within the data D(2), which is originally temporarily stored in the buffer B(2). As a result, in Step 928, the ECC decoder 1144 can perform error checking or ECC decoding on the majority vote data in the buffer B(2).

As mentioned above, FIG. 3 illustrates a situation where N=3. This is for illustrative purposes only, and is not meant to be a limitation of the present invention. According to this embodiment, in a situation where N>3, Step 922 through to Step 924 can be replaced by a series of steps such as Step 922-2, Step 922-3, ..., and Step 922-N, which are utilized for checking whether one or more uncorrectable errors exist in the data D(2) read at the second time, the data D(3) read at the third time, ..., and the data D(N) read at the $N^{th}$ time, respectively.

Figure 4:
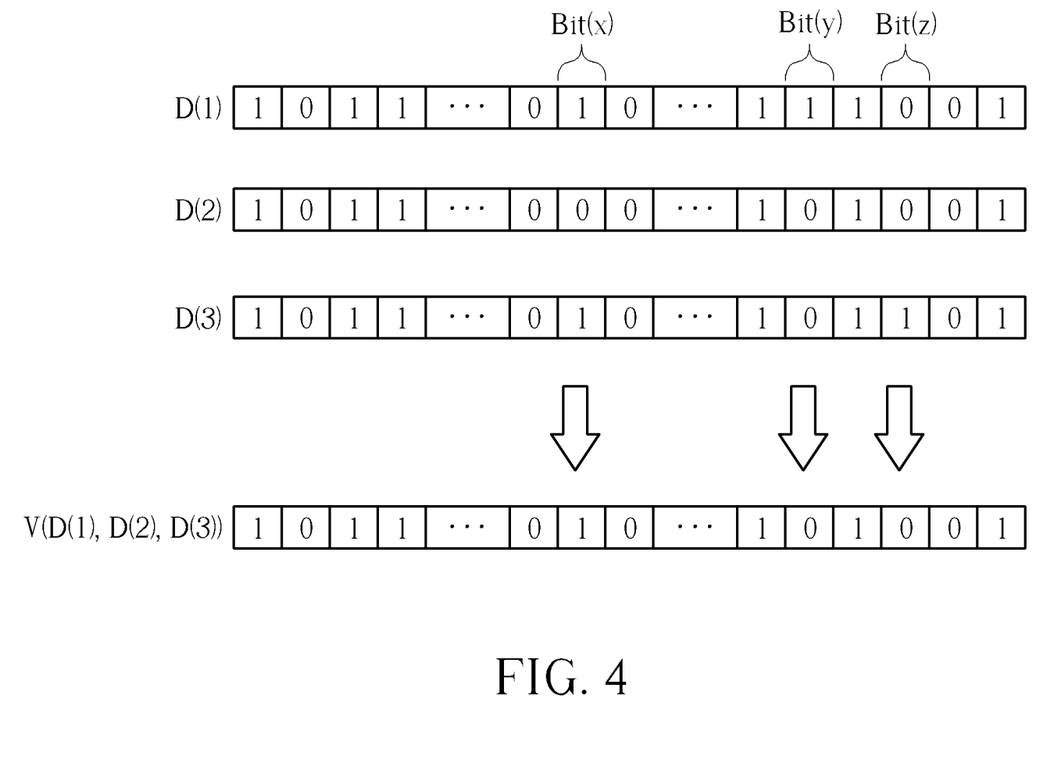
FIG. 4 illustrates majority vote involved with the method shown in FIG. 2 according to an embodiment of the present invention.

FIG. 4 illustrates the majority vote involved with the method 910 shown in FIG. 2 according to an embodiment of the present invention, where this embodiment is a special case of the embodiment shown in FIG. 3. Here, the data D(1), D(2), and D(3) are the same except for the bits Bit(x), Bit(y), and Bit(z). As shown in FIG. 4, the respective bits of the majority vote data V(D(1), D(2), D(3)) comply with majority vote results of the corresponding bits of the data D(1), D(2), and D(3), respectively. For example, all of the first bit Bit(1) of the data D(1), the first bit Bit(1) of the data D(2), and the first bit Bit(1) of the data D(3) are equal to 1, so the first bit Bit(1) of the majority vote data V(D(1), D(2), D(3)) is equal to 1. In another example, the $x^{th}$ bit Bit(x) of the data D(1), the $x^{th}$ bit Bit(x) of the data D(2), and the $x^{th}$ bit Bit(x) of the data D(3) are respectively equal to 1, 0, and 1, which can be simply referred to as the set {1, 0, 1}, and the $x^{th}$ bit Bit(x) of the majority vote data V(D(1), D(2), D(3)) is equal to the value 1 that occurs the most frequently in the set {1, 0, 1}. Similarly, the $y^{th}$ bit Bit(y) of the majority vote data V(D(1), D(2), D(3)) is equal to the value 0 that occurs the most frequently in the set {1, 0, 0} formed with the $y^{th}$ bit Bit(y) of the data D(1), the $y^{th}$ bit Bit(y) of the data D(2), and the $y^{th}$ bit Bit(y) of the data D(3), and the $z^{th}$ bit Bit(z) of the majority vote data V(D(1), D(2), D(3)) is equal to the value 0 that occurs the most frequently in the set {0, 0, 1} formed with the $z^{th}$ bit Bit(z) of the data D(1), the $z^{th}$ bit Bit(z) of the data D(2), and the $z^{th}$ bit Bit(z) of the data D(3).

It is an advantage of the present invention that the present invention can reduce uncorrectable errors of the memory device regarding ECC. In addition, the present invention can give consideration to both operation performance and system resource management, and related art problems such as erroneously marking some blocks as bad blocks will never occur. Additionally, the preferred embodiments of the present invention can save the total buffering space of the buffering regions/buffers, and during reading the data of the last time, both the data of the last time and the majority vote data are properly prepared for further use. Therefore, the present invention method and the associated memory device and the controller thereof can provide extremely high performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reducing uncorrectable errors of a memory device regarding error correction code (ECC), the method comprising:
   performing majority vote according to data read at different times at a same address in order to generate majority vote data corresponding to the address;
   checking whether the majority vote data has any uncorrectable error in order to determine whether to output the majority vote data as data of the address; and
   within the data read at different times at the same address, temporarily storing all of the data except for data of a last time into a plurality of buffering regions/buffers, respectively;
   wherein the step of performing the majority vote according to the data read at different times at the same address in order to generate the majority vote data corresponding to the address further comprises:
   during performing the majority vote, temporarily storing the majority vote data into a second buffering region/buffer of the buffering regions/buffers, in order to utilize a latest generated portion within the majority vote data to replace a latest retrieved portion within data in the second buffering region/buffer, wherein the latest retrieved portion in the second buffering region/buffer is a portion that is latest retrieved for performing the majority vote.

2. A memory device, comprising:
   a Flash memory comprising a plurality of blocks; and
   a controller arranged to access the Flash memory and manage the plurality of blocks, and to reduce uncorrectable errors of the memory device regarding error correction code (ECC), wherein the controller performs majority vote according to data read at different times at a same address in order to generate majority vote data corresponding to the address;
   wherein the controller checks whether the majority vote data has any uncorrectable error in order to determine whether to output the majority vote data as data of the address, and, within the data read at different times at the same address, temporarily stores all of the data except for data of a last time into a plurality of buffering regions/buffers, respectively, and temporarily stores, corresponding to performing the majority vote, the majority vote data into a second buffering region/buffer of the buffering regions/buffers, in order to utilize a latest generated portion within the majority vote data to replace a latest retrieved portion within data in the second buffering region/buffer; and the latest retrieved portion in the second buffering region/buffer is a portion that is latest retrieved for performing the majority vote.

3. A memory device, comprising:
a Flash memory comprising a plurality of blocks; and
a controller arranged to access the Flash memory and manage the plurality of blocks, and to reduce uncorrectable errors of the memory device regarding error correction code (ECC), wherein the controller performs majority vote according to data read at different times at a same address in order to generate majority vote data corresponding to the address, wherein the controller checks whether the majority vote data has any uncorrectable error in order to determine whether to output the majority vote data as data of the address;
wherein the controller further comprises:
a majority vote module arranged to perform the majority vote according to the data read at different times at the same address in order to generate the majority vote data corresponding to the address;
an ECC decoder arranged to perform ECC decoding; and
a plurality of multiplexers arranged to perform multiplexing operations to control data flows within the controller;
wherein a program code executed by a microprocessor within the controller comprises a plurality of program modules/units; and at least a portion of the majority vote module, the ECC decoder, and the multiplexers is implemented by utilizing the microprocessor executing the program modules/units.

4. A controller of a memory device, the controller being utilized for accessing a Flash memory of the memory device, the Flash memory comprising a plurality of blocks, the controller comprising:
a read only memory (ROM) arranged to store a program code; and
a microprocessor arranged to execute the program code to control the access to the Flash memory and manage the plurality of blocks, wherein the controller that executes the program code by utilizing the microprocessor is further arranged to reduce uncorrectable errors of the memory device regarding error correction code (ECC);
wherein the controller performs majority vote according to data read at different times at a same address in order to generate majority vote data corresponding to the address; the controller checks whether the majority vote data has any uncorrectable error in order to determine whether to output the majority vote data as data of the address, and, within the data read at different times at the same address, temporarily stores all of the data except for data of a last time into a plurality of buffering regions/buffers, respectively, and temporarily stores, corresponding to performing the majority vote, the majority vote data into a second buffering region/buffer of the buffering regions/buffers, in order to utilize a latest generated portion within the majority vote data to replace a latest retrieved portion within data in the second buffering region/buffer; and the latest retrieved portion in the second buffering region/buffer is a portion that is latest retrieved for performing the majority vote.

5. A controller of a memory device, the controller being utilized for accessing a Flash memory of the memory device, the Flash memory comprising a plurality of blocks, the controller comprising:
a read only memory (ROM) arranged to store a program code; and
a microprocessor arranged to execute the program code to control the access to the Flash memory and manage the plurality of blocks, wherein the controller that executes the program code by utilizing the microprocessor is further arranged to reduce uncorrectable errors of the memory device regarding error correction code (ECC);
wherein the controller performs majority vote according to data read at different times at a same address in order to generate majority vote data corresponding to the address; the controller checks whether the majority vote data has any uncorrectable error in order to determine whether to output the majority vote data as data of the address; and the controller further comprises:
a majority vote module arranged to perform the majority vote according to the data read at different times at the same address in order to generate the majority vote data corresponding to the address;
an ECC decoder arranged to perform ECC decoding; and
a plurality of multiplexers arranged to perform multiplexing operations to control data flows within the controller;
wherein a program code executed by a microprocessor within the controller comprises a plurality of program modules/units; and at least a portion of the majority vote module, the ECC decoder, and the multiplexers is implemented by utilizing the microprocessor executing the program modules/units.

* * * * *